United States Patent Office 3,467,581
Patented Sept. 16, 1969

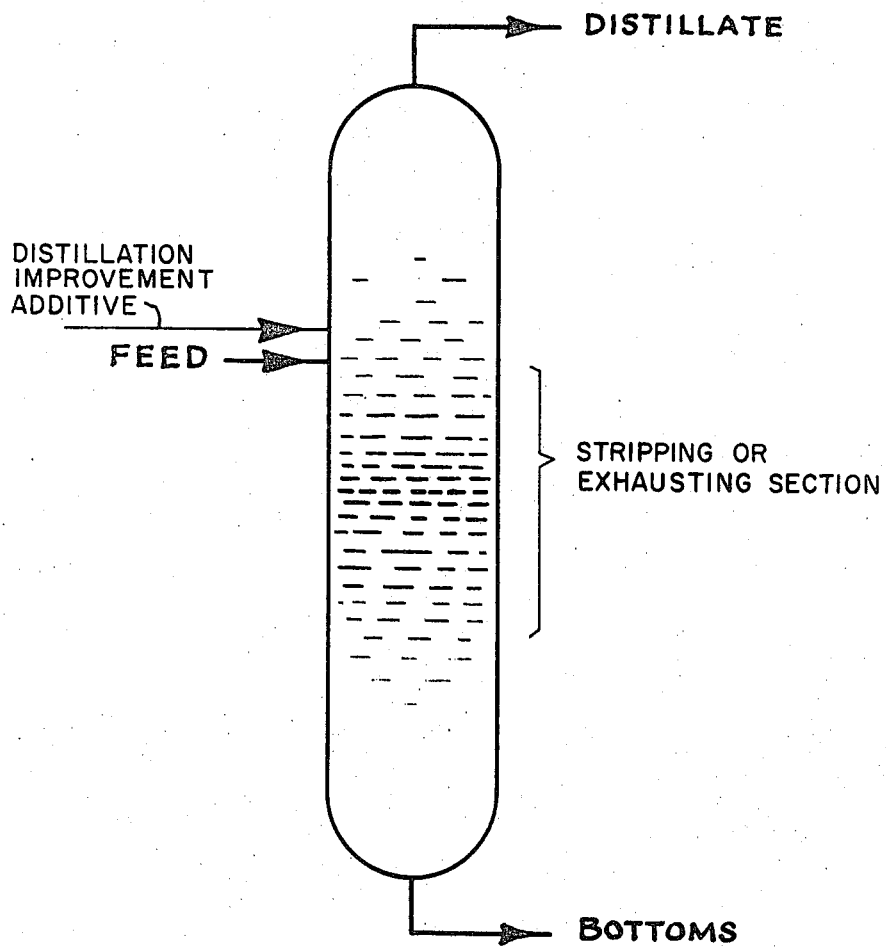

3,467,581
METHOD FOR IMPROVING DISTILLATION EFFICIENCY OF AN AQUEOUS MIXTURE BY ADDITION OF A SILICON-CONTAINING MATERIAL
Walter R. Privette, La Grange, and Elemer Domba, Olympia Fields, Ill., assignors to Nalco Chemical Company, Chicago, Ill., a corporation of Delaware
Filed Dec. 13, 1965, Ser. No. 513,603
Int. Cl. B01d 3/34
U.S. Cl. 203—57         4 Claims

ABSTRACT OF THE DISCLOSURE

A method for improving the efficiency of fixed design distillation systems used to separate water-soluble organic polar compounds from aqueous solutions thereof which comprises treating the liquids being fractionated by the systems with water insoluble organic compounds.

---

This invention relates to a method for increasing distillation efficiency by chemical means. It is specifically directed to improving the efficiency of tray and packed distillation columns.

Tray columns and packed towers are a form of liquid-gas transfer devices which are used for the separation of chemicals based on phase-equilibria relationships. A common separation accomplished by distillation columns is the removal of water-soluble organic polar compounds from aqueous solutions thereof. Exemplary of such systems which are separated by means of distillation equipment are alcohol-water solutions, which contain such alcohols as methanol, ethanol, propanol and isopropanol. Other water-soluble materials capable of being extracted by distillation techniques are water-soluble glycols and amines.

While the invention may be practiced by chemically treating either tray columns, or packed columns, it is particularly directed to treatment of aqueous solutions of water-soluble organic polar compounds which are separated in tray columns, particularly cross-flow tray columns. These columns as well as other distillation units are usually of fixed design from the standpoint that they are tailored to separate specific systems. In tray columns, operating efficiency is frequently diminished by such phenomena as excessive entrainment, flooding or priming. These phenomena are indirectly associated with such specific chemical phenomena as misting, viscosities of liquids moving through the trays of tower columns, surface tension, lubricity and diffusion. The physical chemical phenomena which are interrelated with the above include such effects as double layer repulsion forces and the like.

It has been found that when one or more of the above factors in a given aqueous tower system are altered sufficiently, an increase in distillation efficiency is achieved. This increase in disillation efficiency is evidenced by an increased throughput and by an increase in the fractionation power of the system.

The chemicals used to increase the distillation efficiency of distillation columns used by this invention may be selected from a wide variety of materials although, as hereinafter will be shown, they must contain specific atoms and chemical functional groupings in order to be effective.

Another important feature of the invention, in a specific embodiment thereof, resides in the startling discovery that certain chemicals are exremely effective in improving distillation efficiency when they are added at a point just above the column interface, which interface is the junction of the two distillates being separated. It therefore becomes an object of the invention to provide a chemical method for improving the distillation efficiency of a fixed design distillation system used to separate water-soluble organic polar compounds from aqueous solutions thereof.

Another object of the invention is to utilize a specific class of organic compounds for improving the efficiency of fixed design distillation systems by adding such chemicals to such systems at a point above the interface thereof.

Other objects will appear hereinafter.

The drawing is a schematic representation of a continuous still.

In accordance with the invention, it has been found that the efficiency of fixed design distillation systems used to separate water-soluble organic polar compounds from from aqueous solutions thereof may be accomplished by treating such systems, preferably at a point above the column interface, with at least 5 p.p.m. of a water-insoluble compound which contains at least one non-ionizable group of the type comprising amido, ether, ester, keto and nitro, with such compounds being further characterized as containing one of the elements, O, F, Si, P and N. The chemicals are most preferably employed to treat alcohol-water solutions which contain such alcohols as ethanol and isopropanol. Due to the varying natures of the systems, distillation column design, and the like, it will be understood that some experimentation is necessary to determine the optimum chemicals to produce the most beneficial results.

To illustrate typical chemicals used in the practices of the invention, the following summations are presented. One excellent group of chemicals are cyclic siloxanes. In general, this group of compounds are dialkyl substituted cyclic siloxanes composed of 4–16 membered rings interrupted by at least one siloxane bonded dense silica particle having an ultimate particle diameter of 5–150 millimicrons and a plurality of surface silanol groups.

The above-described compositions are prepared by a specific method which will be described in more detail below. The reactants are well-known materials and need little elaboration. The first reactant is a silica particle having reactive surface silanol (—SiOH) groups. These siliceous materials may be either agglomerated, that is, joined in groups or clusters through an Si—O—Si type of bonding or may exist as discrete, non-aggregated silica particles. In any case, whether agglomerated, discrete or even bonded by some type of hydrogen bonding or electrostatic type linkage, the ultimate or individual particle size of these silica reactants ranges from about 5 to about 150 millicrons in terms of average particle diameter. Greatly preferred materials are discrete, dense, non-aggregated particles of silica, or those capable of becoming discrete in nature under reaction conditions.

The silica may be chosen from a variety of well-known forms of silica. For example, a precipitated silica may be used, as for example, one prepared by peptizing a colloidal silica sol. Other suitable silica reactants are silica aerogels. These are silicas which are colloidal in nature and are generally prepared by replacing the water of a silica hydrogel with a low boiling organic liquid, miscible in water, followed by heating the resultant product in an autoclave above the critical temperature of the liquid. A particularly preferred type of silica reactant is a fume silica. This is a silica capable of being put into colloidal form, which is obtained by burning silicon tetrachloride and collecting the resulting silica smoke. A similar product may be obtained by burning a tetraorthosilicate at extremely high temperature. In any case, any silica particle may be used which has sufficient reactivity to form siloxane bonds through reaction of silanol groups existing on the surface of the particle. Suitable silica particles not only have the above stated ultimate particle diameter size, but also generally have a large surface area of at least 20 m.$^2$/g. and usually in excess of 120 m.²/g. The particle surface area may even run as high as 500–600 m.²/g.

One specific silicia substance having found particular utility as a reactant in producing the above compositions is a commercial product sold under the trade name "Cab-O-Sil." This type of silica is almost substantially chemically pure silica, expressed in terms of $SiO_2$ and is made up of extremely fine, well-defined particles. This material is produced by a vapor phase hydrolysis process of heating silicone tetrachloride in a furnace at 1100° C. The individual separate particles of silicone dioxide which are formed almost instant are collected in a cyclone. Table I below gives specific chemical and physical characteristics of this material.

TABLE I

| | |
|---|---|
| Silica content (moisture-free basis) | 99.0–99.7%. |
| Free moisture (105° C.) | 0.2–1.5%. |
| Ignition loss at 1000° C. (excluding moisture) | 0.2–1.0%. |
| CaO, MgO, $Na_2O$ | 0.00%. |
| $Fe_2O_3 + Al_2O_3$ | 0.01%. |
| Particle size range | 0.015–0.020 micron. |
| Surface area (nitrogen adsorption) | 175–200 sq. meters/gm. |
| Specific gravity | 2.1. |
| Color | White. |
| Refractive index | 1.55. |
| pH (4% aqueous dispersion) | 3.5–4.2. |
| Oil absorption (Gardner method) | 150 lbs. oil/100 lbs. pigment. |
| Bulking value | 0.057 gal./lb. |

The other reactant involved in producing these compositions is a dialkyl dihalo silane. Preferred silanes are those having two lower alkyl radicals attached to the silicon atom. These lower alkyl radicals most preferably contain four carbon atoms or less. Thus, suitable silanes are dimethyl dihalo silane, diethyl dihalo silane, diisopropyl dihalo silane, dibutyl dihalo silane, etc. The halo group may be chosen from among any of the halogens such as chlorine and bormine. Most preferred are the dichloro derivatives. A reactant which has found special utility in preparing these compositions is dimethyl dichloro silane.

With more specific reference to the structure of these materials, the cyclic siloxane rings are interrupted by a siloxane bonding type reaction with the silica particle through its reactive surface silanol groups. The cyclic siloxanes may be composed of as few as four members, or as great as sixteen members. Likewise, the rings may be interrupted by more than one silica particle via siloxane bonding. Similarly, each silica particle may have one or more cyclic rings attached to its surface via chemical bonding. A very minor proportion of the silica particles may be joined by linear polysiloxane linkages. However, it has been determined that the vast majority of surface reaction upon the silica particles is in the nature of cyclic structures.

In order to form the above-described compositions, special process conditions must be carefully followed. Specifically, the silica should be dissolved in aliphatic hydrocrabon or a paraffin oil such as mineral seal oil. The concentration of silica in parffin may vary from about 1 to about 20% by weight. Also added are small amounts of water which aid in hydrolyzing the subsequently added dialkyl dihalo silane. The water content may be varied from about 1 to 10% by weight based on paraffin oil content. It is greatly preferred, however, that the amount of water added be exactly equal to the amount necessary for theoretical hydrolysis of the dialkyl dihalo silane reactant to an intermediate dimethyl silane diol.

The dialkyl dihalo silane is then added to the above mixture at a relatively slow rate. The amount of silane added may be varied from about 4 parts per 1 part of silica to about 1 part silane to 4 parts of silica. A typical reaction involves equal parts of silica and dihalo dialkyl silane.

The reaction itself should be run at less than about 40° C. and more preferably less than 35° C. In most cases, cooling is necessary to maintain the temperature within the above stated ranges because of the exothermic nature of the cyclic reaction. Due to the silane hydrolysis and release of hydro halide acid, such as hydrochloric acid, the pH of the reaction mixture is quite low during formation of cyclic siloxane rings attached to silica. It is important that both a low reaction temperature be maintained as well that the reaction be effected at a pH at least below about 4.0 and most preferably less than 1.0. If either of these variables are not followed as suggested, either the cyclic structures are not obtained, or silica is not caused to enter into the ring structure itself.

The addition of dialkyl dichlorosilane may vary from about ¼ hours to about 6 hours, but generally is completed within about ½ hour to about 2 hours. Depending upon the batch size, the rate of addition of dialkyl dihalo silane may vary from about ½ lb. to about 100 lbs. per hour. During the whole of the reaction, rapid agitation of the reaction mass should be carried out. Impeller peripheral speeds of at least 1000 feet per minute have been employed with good success. After addition of the silane is completed, further mixing may be effected, if desired.

After reaction is completed, the temperature may be raised to strip off hydrohalide acids and low boiling residues. This distillation is preferably accomplished under vacuum. Temperatures as high as 130–160° C. under vacuums of 5–50 mm. Hg for 1–6 hours are generally sufficient to attain this objective.

The following example illustrates a typical preparative technique useful in synthesizing cyclic siloxane compositions.

Example I

To a 20 gallon glassed-steel reactor equipped with a variable speed drive agitator (300–500 r.p.m.), baffle, and a 7.9 square foot cooling jacket, was added 100 pounds of mineral seal oil, 3 pounds of water, and 10 pounds of fume silica. The batch was allowed to mix well for at least 15 minutes. The peripheral speed of the impeller imparting agitation to the batch was at all times at least 1000 feet per minute.

Cooling water is then introduced into the jacket, and 10 pounds of dimethyl dichlorosilane added over a period of approximately ½ hour. Cooling maintained the pot temperature from about 25° C. to 35° C. Any HCl gas evolved was collected by a countercurrent water scrubber attached to the system. The mixture was then allowed to mix for two additional hours at 25°–35° C.

Vacuum was then applied very slowly until a 15–20 mm. Hg level was attained. The pot temperature was raised slowly to 140° C. and maintained at 140° C.–150° C. under the above vacuum for three hours. The batch was then cooled and drummed. The finished product had a pH of 4–5, and was a clear, thixotropic type material.

The reaction products of the invention may be isolated from the paraffin solvent and employed in 100% active form. It is greatly preferred, however, that the cyclic siloxane-silica compounds be employed directly as processed in form of dispersions in aliphatic hydrocarbon oils. These latter oils may include mineral seal oil, kerosene, various light aliphatic fuel oils, gas oils, paraffin waxes, and the like. A preferred composition comprises 1–40% by weight of active material dispersed in one or more of the above aliphatic oils or others.

In many instances emulsifying agents, such as polyoxyethylene glycols and polyalkylene glycols, for example, those marketed under the trade names of "Ucon" and "Carbowax," may be added to the above reaction products or to their formulations in aliphatic hydrocarbon oil extenders. Compounds other than emulsifiers and extenders, such as dispersants and the like, may also be added to the reaction products of the invention in order to obtain formulated products of the desired physical characteristics in order to overcome feeding problems, etc.

Another useful group of compounds are materials which are derived from the reaction of a boron compound and a polyethyl silicate. They have the general structural formula:

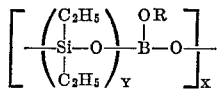

where X is an integer ranging from 10 to 200, Y is an integer ranging from 4 to 15 and R is an organic alkyl radical ranging from 1 to 18 carbon atoms. The end groupings of the above polymer may be either

R— or

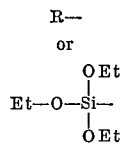

The polymer itself is best described as a polyoxyethylsilicoxy-alkylboroxy oligomer having the above repeating units.

The boron compound used to form the above compositions by reaction with polyethyl silicate may be chosen from among trialkyl borates or boric anhydride. The trialkyl borate compounds may have similar or different radicals attached to the boron atom. It is preferred, however, that each of the three radicals attached to the boron be identical. Typical trialkyl borates useful as reactants include trimethyl borate, triethyl borate, triisopropyl borate, tripropyl borate, tributyl borate, trioctyl borate, tridodecyl borate, etc. The most preferred boron reactants are boric anhydride itself and triethyl borate. When boric anhydride is employed as a condensing agent with the polyethyl silicate, during the reaction ethanol is given off. The ethanol in turn reacts with the OH radical attached to the boron atom to produce the corresponding —B—OEt grouping either prior to reaction with the polyethyl silicate polymer and/or after the boron atom has already been made part of the polymer itself.

The other reactant used in forming the just-described compositions is a polyethyl silicate. Preferred materials are those having an average molecular weight ranging from 300 to 2000 and more preferably from 400 to 1500. These polysilicate materials are generally derived from controlled hydrolysis of silicon tetrahalides and particularly silicon tetrachloride in aqueous-ethanolic solutions. A mixture of polymeric materials is formed, but the predominant species has the following general formula:

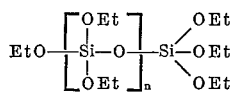

where $n$ is an integer ranging from about 4 to about 15 and Et represents the $C_2H_5$ group. In addition other lower molecular weight polysiloxanes may be present which may be termed, for convenience, hydrolyzate condensation products of the starting silicon tetrahalide reactants. These hydrolyzate condensation products generally contain terminal hydroxyl groups. More preferred polyethyl silicate mixtures therefore have at least 1% of their weight composed of free reactive hydroxyl groups and most preferably at least 2%. A typical commercial ethyl silicate polymer has 2–3% of its molecular weight composed of hydroxyls. These reactive hydroxyl containing compounds are believed to act as "bridge" reactants between the boron and polyethyl silicate compositions represented by the above formula. In effect, these low molecular weight polysiloxanes which contain reactive hydroxyl groups promote further polymerization as well as reaction of the boron with the polyethyl silicate polymers.

Likewise, these above polysilicate materials may be defined solely in terms of their available silica content expressed as $SiO_2$. In materials of this type, as the extent of polymerization increases, silica content, expressed as $SiO_2$ likewise proportionally increases. Preferred polyethyl silicates have an available silica content, expressed as $SiO_2$, ranging from 35% by weight of the overall molecule weight to about 55% by weight. More preferred materials have $SiO_2$ contents within a range of 35–45%. Most preferably, the $SiO_2$ content of the polyethyl silicate reactant ranges from about 38% to about 42% by weight. As a comparison a pure monomeric tetraortho silicate ester has a silica content ($SiO_2$) of approximately 28% by weight. Thus, by the term "polyethyl silicate" is meant a composition mixture characterized by the above distinguishing physical and chemical properties which is usually formed by controlled ethanolic hydrolysis of silicon tetrahalide or similar monomeric derivatives.

A preferred starting polyethyl silicate reactant which has been found to be extremely valuable in preparing additives of the invention is sold under the trademark "Ethyl Silicate 40." This compound is a mixture of ethylpolysilicate having about 40% available silica expressed as $SiO_2$ and is synthesized from the controlled hydrolysis of tetraethylortho silicate or tetrachlorosilicon. This polyethyl silicate is generally described as a mixed polymer of ethyl silicate with an average of 5 silicon atoms per molecule.

One specific source of this material has a specific gravity at 20° C. of 1.0558, a freezing point of —90° C., a viscosity at 20° C. of 3.9 cps. and a refractive index at 20° C. of 1.3965. This particular polymeric substance was derived from the controlled hydrolysis of silicon tetrachloride in 95% ethanol and 5% water.

These boron derivatives are prepared by heating one or more of the above described boron compounds and the polyethyl silicate reactant together at temperatures preferably from about 70° C. to about 250° C. The time of heating may be varied over a wide range, but preferably is carried out in from about 2 to about 12 hours. The most preferred products are prepared by heating from 5 to about 10 hours. Vacuum may also be employed during the heating step to measured levels as low as 5 mm. of mercury. Excellent products have been prepared by heating the two reactants at pot temperatures ranging from 80 to 200° C. over a period of 6–10 hours.

During the reaction the lower molecular weight silicate polymers having free reactive hydroxyl groups which help to induce molecule reactivity, condense with the boron molecule to "build" in boron atoms into the final polymeric structure via and —O— B—O— bonding. As the reaction proceeds, alcohol such as ethanol is removed along with low boiling polyethylsilicate fractions. The final product then is a 100% active, slightly viscous liquid, free of inactive recrement or diluents, which may be directly introduced into distillation columns.

Preferred boron products may be prepared by reacting from about 1.0% to about 20% by weight of the boron and from about 80% to about 99% by weight of the polyethyl silicate reactant, both percentages being based on total reaction mass weight. More preferred reaction masses are composed of 1–10% by weight of boron and 90–99% by weight of the prepolymerized polyethyl silicate.

It has also been discovered that the reaction between the boron compound and polyethyl silicate may be made materially more rapid if it is run in the presence of a finely divided silica. The silica, which is believed to act in the nature of a catalyst, should generally have a large surface area of at least 20 m.²/g. and usually in excess of 120 m.²/g. The particle surface area may be run as high as 500–600 m.²/g. When the finely divided, high surface area silica is present, the reaction is generally speeded up to about 15–75% over those runs involving no silica.

The silica catalyst may be chosen from a variety of well-known forms of silica which have already been described above. For example, a precipitated silica may be used as well as silica aerogels. A particularly preferred type of silica reactant is a fume silica such as "Cab-O-Sil" previously described.

When finely divided silica is used to increase reactivity of boron and polyethyl silicate, generally from about 0.1% to about 10.0% by weight of silica is employed based on total reaction mass weight. More preferably, 0.1–5% by weight of silica is used. It is understood, of course, that the products of the invention may nevertheless be synthesized without employment of silica whose use is solely that of speeding up the reaction time.

The following examples state typical modes of preparation representative useful boron compositions.

Example II

A reactor was charged with 94 pounds of "Ethyl Silicate 40," 3.0 pounds of boric anhydride, and 3.0 pounds of "Cab-O-Sil." The mixture was heated with stirring, and ethanol began to distill over at 79° C. When alcohol no longer distilled over, the temperature of the reaction mixture was increased to 200° C. At this time, the vapor temperature rose to 120–130° C. but was not allowed to exceed 130° C. The aforementioned pot temperature was maintained until a total reaction time of approximately 6½ hours was reached. The product, falling within the above listed structural formula where R is ethyl, was then cooled and drummed.

Example III

In this example the "Cab-O-Sil" silica catalyst was omitted. The reaction was run exactly as set out in Example I above, but the reaction time to achieve the suitable product was approximately 9½ hours in this instance. As in Example I, the product fell within the general structural formula with R being ethyl.

As mentioned above, when the products of the invention are used to treat distillation columns, they may be used as such without any further compounding or modification. If desired, however, the reaction products may be dispersed in aliphatic hydrocarbon oils such as mineral seal oil, kerosene, various light aliphatic fuel oils, gas oils, paraffin waxes, and the like.

Again, emulsifying agents, extenders, dispersants and the like, may also be added to the boron compositions in order to improve their physical characteristics.

A third group of compounds are prepared by reacting a silica organosol and a polyethyl silicate. The silica organosol material used as one of the reactants is well-known and needs little elaboration. Such materials and their mode of preparation are discussed in U.S. Patents 2,433,776, 2,433,777, 2,433,778, 2,433,779 and 2,433,780. In newer preparative techniques the starting organo silica sol reactants of the invention are prepared by replacing the water phase of aqueous colloidal silica sols with hydrophilic organic solvents. The precursor aqueous silica sols contain silica particles colloidally dispersed in water. These particles are discrete, dense individual units of silica and have an average particle diameter not greater than 150 millimicrons, and preferaly between 5 and 150 millimicrons. When the particle sizes of the silica sols are within the ranges specified the silica particles particles present in the starting aqueous sols will have surface areas of at least 20 m.²/gram and more often between 100 m.²/gram and 600 m.²/gram.

Preferred aqueous silica sols may be conveniently prepared by utilizing the process of Bird, U.S. 2,244,325. This patent teaches the treatment of dilute alkali metal silicate solutions with cation exchange resins in the hydrogen form to remove substantially all the alkali metal from the silicate. The products produced by the Bird ion exchange method are most frequently dilute, e.g., 1–4% by weight solutions of colloidal silica. Since silica sols of this type are too dilute to be economically utilized it is expedient that they be concentrated to a point whereby the silica concentration is between about 5% and 60% by weight of silica expressed as $SiO_2$. Several methods have been described for conveniently concentrating silica sols of the type produced by Bird, U.S. 2,244,325. Particular reference may be made to U.S. Patents 2,574,902, 2,601,235, 2,680,721 and 2,929,790. By using the teaching of these patents, which effectively employ constant volume evaporation techniques, it is possible to produce aqueous colloidal silica sols which have silica concentrations which preferably range between 5% and 60% and most preferably between 20% and 40% by weight.

When producing aqueous silica sols of the type described, for instance, in Bechtold et al., U.S. 2,574,902, it is preferred to stabilize the sols by adjusting the silica to alkali metal ratio expressed as $SiO_2:Na_2O$, so that it is at most 130:1 and more preferably in the range from 70:1 to 100:1. The alkali metal containing sols are not entirely compatible with organic systems due to the fact that the salt itself causes gelation or precipitation of the silica particles. This "salting-out" effect cannot be prevented even by the use of certain protective agents in replacing the continuous water-phase of an aqueous silica sol with an organic liquid. To prevent this, it is therefore a better practice that these cations be first removed from the surface of the colloidally dispersed silica particles prior to formation of organo sols. This may be readily accomplished by treating typical silica sols of the type described in Bechtold et al. U.S. Patent 2,574,902, with a cation exchange resin in the hydroxide form. This treatment tends to produce a finished sol which I prefer to call "salt-free." The particles of silica in such a sol are also considered as being "salt-free."

Typical commercially available silica sols which may be first deionized as described above to give preferred starting materials that may be subsequently modified to produce salt-free organo sols are those aqueous silica sols which are sold under the trademark "Nalcoag." Typical physical and chemical properties of these types of sols, prior to deionization are set forth below:

TABLE II

| | Sol I | Sol II | Sol III |
|---|---|---|---|
| Percent colloidal silica as $SiO_2$ | 30 | 35–36 | 49–50 |
| pH | 10.2 | 8.6 | 9.0±0.1 |
| Viscosity at 77° F., cps | (¹) | (¹) | 20–30 |
| Average particle diameter-millimicrons | 11–16 | 11–22 | 20–25 |
| Specific gravity at 69° F | 1.205 | 1.255 | 1.385 |
| Average surface area, m.² per gram of $SiO_2$ | 190–270 | 135–190 | 120–150 |
| Density/gallon at 68° F | 10.0 | 10.5 | 11.6 |
| Freezing point, ° F | 32 | 32 | 32 |
| $Na_2O$ percent | 0.40 | 0.10 | 0.30 |

¹ Less than 5.

To illustrate deionization of the above type sols, the following is presented by way of example.

Example IV

A silica sol corresponding to Sol No. II was decationized by passing the sol through a column of cation resin in the hydrogen form. The resin was Nalcite HCR which is described in U.S. Patent 2,366,007. Following this treatment, the silica sol was passed through a strong base anion exchange resin in the hydroxide form. In this instance, the resin was a commercially available product known as "Nalcite SBR," which is described in U.S. Patent 2,591,573.

It is estimated that the treated sol will have an approximate shelf life of three years at 75° F. Sols deionized in accordance with the above technique will have a pH within a range of 2.7 to 4.0, a specific conductivity of between 100 and 500 micromhos/cm. and when the silica concentration is between 5 and 60% by weight, their viscosities will range between 1 and 20 cps.

A comparison of the stability of the treated (deionized) sol and the stability of an identical sol that had not been deionized, when adjusted to various pH values with $H_2SO_4$, or NaOH, is set forth in the following table:

TABLE III

|  | pH | Stability 75° F. | 120° F. | Treated sol | pH | Stability 75° F. | 120° F. |
|---|---|---|---|---|---|---|---|
| Untreated sol: |  |  |  |  |  |  |  |
| 1 | 1.0 | 1 month | | 1 | 1.0 | 2 months | |
| 2 | 2.0 | do | 3 days | 2 | 2.0 | 5 months | 17 days. |
| 3 | 5.0 | 18 hours | | 3 | 5.0 | do | |
| 4 | 6.0 | do | | 4 | 6.0 | 72 days | |
| 5 | 7.0 | 1 month | 2 days | 5 | 7.0 | (¹) | (¹) |

[1] No viscosity increase after 5 months.

As is apparent from the above table the treated sol is stable under acid and neutral conditions, whereas the untreated sol is highly unstable under such conditions.

An important advantage derived by the use of a strong base anion exchanger in the hydrogen form in the deionization procedure described above is that the finished products are substantially free of $CO_2$ and low molecular weight species of silicic acid. These deionized sols are extremely stable, thereby allowing them to be prepared and stored well in advance of the subsequent processes to which they are subjected. They have a salt content expressed as $Na_2SO_4$, of less than 0.10%.

The above type silica sols and more preferably "salt-free" silica sols are then treated with various hydrophilic organic solvents which are employed to replace the water phase of the starting aqueous silica sols. Preferred organic solvents which subsequently become the continuous phase of the organo sols are water-miscible alcohols and more preferably primary monohydric alcohols such as methanol, ethanol, propanol, isopropyl alcohol, t-butanol, etc. The most preferred alcohols are the well-known "Cellosolve" alcohols. Examples of "Cellosolve" type alcohols are 2-methoxyethanol, 2-ethoxyethanol, 2-propoxyethanol and 2-butoxyethanol. These latter compounds are better known as methyl-"Cellosolve," ethyl-"Cellosolve," propyl-"Cellosolve," and butyl-"Cellosolve." They may be generically classified as glycol ethers. Of these the most preferred is 2-ethoxyethanol.

The organo sols may be prepared by adding organic solvent to the aqueous silica sol and distilling off the aqueous phase, leaving behind at termination of the distillation, a substantially organic continuous phase. The distillation is more preferably carried out in a vacuo so that substantially all the water from the system is removed at relatively low temperature. Excesses of organic solvent are usually added periodically or in a continuous flow until all the water has been replaced.

The organo sol reactants are therefore non-aqueous silica sols composed of a hydrophilic organic solvent and preferably a water-miscible alcohol as a continuous phase and colloidal, amorphous, dense spherical particles of silica as the dispersed phase. Preferred silica particles are essentially salt-free whereby excellent compatibility with the organic solvent is achieved. The particle diameter of the silica particles in the organo sol generally vary from 5 to about 150 millimicrons. The specific area of the colloidal silica particles is at least 20 m.²/g., and generally in excess of 100 m.²/g. Preferred starting organo sols contain from about 5 to about 60% by weight of the above described silica particles colloidally dispersed in the organic phase. More preferred organo sols contain from about 20% by weight of silica expressed as $SiO_2$ to about 40% by weight.

A typical organo sol which may be used as a reactant is one containing approximately 35% of silica colloidally dispersed in ethyl-"Cellosolve" (2-ethoxyethanol). The silica particles have a specific surface area of 140 m.²/g., and a particle diameter range of 15–40 millimicrons. The silica particles are salt-free, since the sol is derived from a deionized aqueous silica sol.

The other reactant along with the just-mentioned organosol used in forming this preferred group of materials are the polyethyl silicates previously described. Preferred materials are those having an average molecular weight ranging from 300 to 2000 and more preferably from 400 to 1500. As previously discussed, a typical ethyl silicate polymer has 2–3% of its molecular weight composed of hydroxyls. Again, these reactive hydroxyl containing compounds are believed to act as "bridge" reactants between the surface silanol groups of the silica particles contained in the starting organosol materials and the polyethyl silicate compositions represented by the above formula. In effect, these low molecular weight polysiloxanes which contain reactive hydroxyl groups promote the surface modification or ligation of the colloidal silica particles with the polyethyl silicate polymers.

The compositions used in the invention are prepared by heating the above-described organo silica sol and polyethyl silicate reactants together at temperatures preferably from about 120° C. to about 250° C. The time of heating may be varied over a wide range, but preferably is carried out in from about 2 to about 12 hours. The most preferred products are prepared by heating from 5 to about 10 hours. Vacuum may also be employed during the heating step to measured levels as low as 5 mm. of mercury. Excellent products have been prepared by heating the two reactants at pot temperatures ranging from 100 to 250° C. over a period of 2–8 hours under reduced pressures ranging from 10 to 50 mm. of mercury.

The exact molecular structures of the final reaction products cannot be set forth due to the complexity and variable makeup of the polyethyl silicate starting material. It is believed that both surface reaction on the silica particles of the organo sol occurs as well as further polymerization of the polyethyl silicate at the relatively high temperature of reaction. Particularly, as mentioned above, the lower molecular weight silicate polymers having free reactive hydroxyl groups help to induce molecule reactivity and particularly reaction between the surface silanol groups of the silica particles and the silicon atoms of the polyethyl silicate molecules to which ethoxy groups are attached. During the reaction itself, ethanol and the hydrophilic organic phase of the starting organo silica sol are removed along with low boiling polyethyl-silicate fractions. The final product then is a 100% active slightly viscous liquid free of inactive recrement or diluents, which may be directly employed. It is believed that in addition to surface modified silica particles there are also present cyclic and linear high molecular weight polyethyl silicates. The reaction products are organophilic but not hydrophobic since they may be wetted with water. Infrared spectral analysis shows almost complete absence of free hydroxyl groups in contradistinction to like analysis of starting polyethyl silicate reactants which preferably contain hydroxyl groups in amounts stated above. Likewise, the reaction products contain Si—O—C type bonding and no direct carbon bonding to silicon atoms was found by spectral analysis.

Preferred reaction products are those in which the beginning reaction mass comprises from about 0.1 to about 50% by weight of the silica organosol and from about 50 to about 99% by weight of the polyethyl silicate reactant. More preferred reaction masses are composed of 10-40% by weight of silica organosol and 60-90% by weight of the pre-polymerized polyethyl silicate. Reaction products formed by heating the reactants much above 300° C. form extremely viscous or gelled material of an exceptionally high molecular weight which are generally of little or no use in the invention.

The following example states a typical mode of preparation of a typical composition of this group.

Example V

A reactor was charged with 464 lbs. of "Ethyl Silicate 40" and 136 lbs. of a salt-free organo sol containing 34% silica colloidally dispersed in 2-ethoxyethanol. The silica itself was salt-free, had an average particle diameter of 20-50 millimicrons and a specific surface area of 140 m.$^2$/gram. This organo sol had been previously prepared by replacement of the water phase of salt-free aqueous silica sol with ethyl "Cellosolve." Prior to introduction into the reactor, the organo sol was filtered through a sock type cartridge filter. The pot temperature was raised slowly to a maximum of 210° C. over 6-7 hours. The vapors were passed through a packed column and condensate was refluxed back to the column at a rate which did not allow the column head temperature to exceed 120° C. The distillate was composed primarily of ethanol, "Cellosolve," low boiling silicate fragments and water traces. After distillation had ceased the batch was cooled to approximately 150° C. and vacuum applied slowly (100-200 mm. Hg). Distillate was then collected until approximately 25% of the original charge weight was removed. This was accomplished by slowly increasing the pot temperature to a maximum of 185° C. and increasing the vacuum gradually until the required pounds of distillate were collected. In this specific run this was accomplished by collecting distillate at a pot temperature of 185° C., at a column head temperature of 120° C., and under a vacuum of 70-80 mm. of Hg. The product was then cooled and drummed.

Example VI

To illustrate the efficacy of the invention, a test was run on a large water-isopropanol (40%) still. Results are given below:

TABLE IV

| Time | Crude alcohol feed rate,[1] gals./hr. | Surfactant feed rate, p.p.m. | Remarks |
| --- | --- | --- | --- |
| 1000 | 9,200 | 20 | Start feeding Composition A.[2] |
| 1047 | 9,407 | 20 | Column flooding. |
| 1150 | 9,200 | 20 | Column lined out, increase Composition A feed rate. |
| 1220 | 9,407 | 440 | Do. |
| 1250 | 9,407 | 93 | Steam feed unsteady, column flooding. |
| 1315 | 9,304 | 93 | Reduce alcohol feed rate. |
| 1520 | 9,971 | 88 | Increase alcohol feed rate slowly. |
| 1630 | 10,000 | 82 | |
| 1730 | 10,200 | 82 | Column lined out, stop Composition A. |
| 1733 | 10,200 | 0 | Column flooding. |
| 0945 | 9,200 | 0 | |
| 1015 | 9,672 | 0 | Column loading severely; start Composition B.[3] |
| 1018 | 9,672 | 200 | Column unloaded, increase alcohol feed rate. |
| 1135 | 10,200 | 200 | Column lined out, reduce Composition B feed rate. |
| 1140 | 10,200 | 100 | Column loading, reduce alcohol feed. |
| 1155 | 9,200 | 100 | Column lined out, increase alcohol feed. |
| 1215 | 10,000 | 100 | Column lined out, increase alcohol and Composition B feed. |
| 1305 | 10,200 | 300 | Column lined out. |
| 1310 | 10,200 | 300 | Composition B feed off. |
| 1313 | 10,200 | 0 | Column flooding, start Composition B feed. |
| 1316 | 10,200 | 300 | Column unloaded and lining out. |
| 1330 | 10,200 | 300 | Column lined out. |

[1] Recorded feed rates resulted from correcting observed feed rates for variations in steam feed, which also affects flooding.
[2] Composition A, prepared as per Example II.
[3] Composition B, prepared as per Example V.

From Table IV above it is evident that alcohol feed rate may be increased via use of either Compositions A or B.

Example VII

Using the same conditions as in Example VI with the exception that the feed stock contained 55% alcohol, the dosage rates of Compositions A and B were varied to determine optimum concentrations. The results of these studies are presented below in Table V.

TABLE V

| Formulation | Concentration, p.p.m. | Isopropanol feed stock maximum feed rate, g.p.h. |
| --- | --- | --- |
| Comp. A | 20 | 9,200 |
| Comp. A | 40 | 9,407 |
| Comp. A | 82 | 10,200 |
| Comp. B | 0 | 9,200 |
| Comp. B | 100 | 10,000 |
| Comp. B | 200 | 10,200 |
| Comp. B | 300 | 10,200 |

It appears from the above table that about 82 p.p.m. of Composition A and 200 p.p.m. of Composition B are optimum dosages.

An important aspect of the invention resides in utilizing 5-500 p.p.m. of mineral oil to improve the distillation efficiency of tray and packed columns. To illustrate the effectiveness of mineral oil, the following example is presented.

Example VIII

The test situs was a large tray column used to fractionate 30% ethanol-water solutions. One hundred parts per million of mineral oil was fed at the column interface for several days. The throughput throughout the test was increased twenty percent.

The compositions are particularly effective when used in cross-flow tray columns although remarkable success has been experienced in treating packed columns.

It will be seen from the above illustrative examples that a dramatic increase in distillation efficiency was achieved by utilizing the chemicals described herein. In another test not reported the same chemicals were added to the feed stock and were not effective until the dosages were doubled over the amount shown in the above examples.

The compositions show effectiveness when used at dosages as low as 5 p.p.m. Dosages of from 10-500 p.p.m. are usually required to give optimum performance.

The invention is hereby claimed as follows:

1. A method for improving the efficiency of fixed design distillation columns used to separate water-alcohol solutions, which comprises treating the water-alcohol solution during its fractionation with at least 5 p.p.m. of the reaction product of a silica organo sol and a polyethyl silicate.

2. The method of claim 1 where the reaction product of silica organo sol and polyethyl silicate is added at a point above the stripping section.

3. A method for improving the efficiency of fixed design distillation systems used to separate water soluble organic polar compounds from aqueous solutions thereof which comprises treating the liquids being fractionated by said systems with at least 5 p.p.m. of a water insoluble siloxane from the group consisting of:

(A) a dialkyl substituted cyclic siloxane composed of 4-16 membered rings interrupted by at least one siloxane bonded dense silica particle having an ultimate particle diameter of 5-150 millimicrons and a plurality of surface silanol groups;

(B) a polyoxyethylsilicoxyalkylboroxy oligomer having the following structural formula:

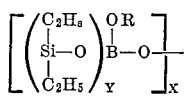

where the Y is an integer ranging from 4 to 15, X is an integer ranging from 10 to 200, and R is an organic alkyl radical containing from 1 to 18 carbon atoms; and (C) a silica organosol reacted with a polyethyl silicate.

4. The method of claim 3 where the dialkyl substituted cyclic siloxane of (A), the polyoxyethylsilicoxyalkylboroxy oligomer of (B), and the silica organosol reacted with a polyethylsilicate of (C) is added at a point above the stripping section.

References Cited

UNITED STATES PATENTS

| | | | |
|---|---|---|---|
| 2,382,044 | 8/1945 | Fisher | 203—62 |
| 2,461,371 | 2/1949 | Cole | 203—20 |
| 2,467,177 | 4/1949 | Zimmer | 252—321 |
| 2,808,378 | 10/1957 | Baldwin et al. | 252—321 |
| 3,180,786 | 4/1965 | Domba et al. | 252—358 |
| 3,264,365 | 8/1966 | Luken | 203—20 |
| 3,267,042 | 8/1966 | Domba | 252—321 |

WILBUR L. BASCOMB, JR., Primary Examiner

U.S. Cl. X.R.

203—20, 51, 52, 60, 62, 63; 252—321, 358; 260—448.2, 643